US006359835B1

(12) United States Patent
Gayl

(10) Patent No.: US 6,359,835 B1
(45) Date of Patent: Mar. 19, 2002

(54) HIGH INTENSITY DIRECTED LIGHT AND SOUND CROWD DISPERSION DEVICE

(75) Inventor: Franz J. Gayl, Washington, DC (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/813,770

(22) Filed: Mar. 20, 2001

(51) Int. Cl.[7] .......... H04B 1/034
(52) U.S. Cl. .......... 367/139; 367/137; 181/142
(58) Field of Search .......... 367/139, 138, 367/137; 181/142; 116/22 A; 381/75

(56) References Cited

U.S. PATENT DOCUMENTS 3,557,899 A * 1/1971 Longinette .......... 367/139
5,859,915 A * 1/1999 Norris .......... 381/75
5,973,999 A * 10/1999 Naff et al. .......... 367/139

* cited by examiner

*Primary Examiner*—Ian J. Lobo
(74) *Attorney, Agent, or Firm*—Donald E. Lincoln

(57) ABSTRACT

A device for influencing human behavior comprises an audio system arranged to produce a sound wave that may be directed to a selected location and a video system arranged to produce a light beam that may be directed to the selected location. The audio system preferably comprises a frame and an array of sound generators mounted in the frame; The frame preferably is formed generally as a tube having a longitudinal axis, an open end and a closed end with the sound wave being emitted generally parallel to the longitudinal axis of the tube. The video system preferably comprises either a flash tube or a laser.

3 Claims, 4 Drawing Sheets

HIGH INTENSITY DIRECTED LIGHT AND SOUND CROWD DISPERSION DEVICE

BACKGROUND OF THE INVENTION

1. Field of the Invention

This invention relates generally to crowd control devices and particularly to devices for use by law enforcement and military forces during civil disturbances to control unruly crowds of people without causing serious injury. Still more particularly, this invention relates to a device that uses sonic and light beams to control human behavior.

2. Description of the Prior Art

A large variety of less-than-lethal systems and devices are currently available for employment by law enforcement and military forces in civil disturbances. Riot batons, rubberized metal pellets, chemical agents, water, foam and firearms represent crude and visually offensive technologies intended to minimize serious injury and death during civil unrest. Unfortunately, technologies and their employment suffer weaknesses that often defeat the purpose of avoiding violent escalation. Many are unable to selectively hold a mob at bay, in essence, outside of rock and Molotov cocktail throwing range. Once a mob is able to assault forces with hand thrown projectiles, the employment of deadly force becomes more probable because forces are directly threatened. Many methods are logistically impractical (high pressure water, foam, etc.), which limits their application. Other methods, such as gas, are indiscriminate in their effects, endangering both non-combatants and friendly forces during engagements. Kinetic projectile firing devices (bean bag rounds, rubber bullets, etc.) can, in many instances, maim or kill their targets in contradiction to their purpose. Finally, the employment of such systems is visually offensive from a media or neutral observer standpoint, often resulting in severe harm to law enforcement and military missions due to political disenchantment.

SUMMARY OF THE INVENTION

This invention is a portable, combined arms, audio-visual system intended for humane deterrence, riot control and the defusing of possible escalation of civil violence. The audio sub-system generates a directional acoustic beam by means of a linear arrangement of piezoelectric transducers, which are phased to produce directionality and power in the forward direction. The longitudinal end-fired-array is contained within an insulated and internally reflective tube to employ resonance to increase sound pressure levels, while protecting the operator and his team-mates from effects. The intended effect of the acoustic energy is to produce aural pain in an adversary sufficient to deter or prevent a continuation of threatening behavior. The audio sub-system can be operated in a large variety of modes, including the enhancement of a single frequency by phasing, a combination of beat frequencies by separate control of two oscillators, a shift in frequency operation, or a randomized, intermittent operation.

The audio sub-system operates in combination with a pulsed, diffusive laser or flash device. The integration of any one of many off-the shelf, eye-safe, pulsed dazzle-producing light systems accomplishes the unique combined arms concept. While such lasers have been separately developed and patented, this invention uniquely integrates them with acoustic effects, with the intent of causing an adversary synergistic sensory overload, thereby increasing the deterrent and preventative effects of the combined device. In summary, this system provides synergistic and temporary discomfiture to two senses, discouraging further civil aggression at safe stand-off range. It also possesses rheostatic tunability to vary the severity and range of effects.

The system is light-weight, man-portable and self contained. It can be scaled to various, frequencies, amplitudes and applications. All electronics for audio and laser/flash device operation may be carried in a backpack. Both systems are powered by batteries and low and/or high voltage capacitors for extended independent operations. The system can alternatively be plugged into vehicle or building power sources for uninterrupted operations. The system can also be scaled up in capability and flexibility for employment as a vehicle mounted crew served device of greater effective range.

A crowd dispersion device according to the present invention for influencing human behavior comprises an audio system arranged to produce a sound wave that may be directed to a selected location and a video system arranged to produce a light beam that may be directed to the selected location.

The audio system included in the present invention preferably comprises a frame and an array of sound generators mounted in the frame. The frame preferably is formed generally as a tube having a longitudinal axis, an open end and a closed end with the sound wave being emitted generally parallel to the longitudinal axis of the tube.

The array of sound generators is arranged to produce a plurality of sound waves having amplitudes that positively combine along the axis of the tube. The audio system may comprise a linear array of piezoelectric transducers mounted inside the frame. The audio system may alternatively comprise an array of piezoelectric transducers mounted on the tube and arranged to produce sound waves directed radially inward in the tube.

The audio system may alternatively comprise an array of sirens mounted on the tube and arranged to produce sound waves directed radially inward in the tube.

The video system preferably comprises either a flash tube or a laser.

The crowd dispersion device according to the present invention may further comprise an electrical system that may be controlled by a human operator to cause the light source and the sound cannon to produce a light beam and a sound wave, respectively, that may be directed to the selected location to encourage a person to move away from the selected location.

The crowd dispersion device according to the present invention may further comprise a power source selection switch connected to the electrical system, a first electrical connector arranged for connection between the electrical system and an external electrical power source. A battery may be connected to the power source selection switch such that a human operator may actuate the power source selection switch to control whether the electrical system receives electrical power from the battery or from the external electrical power source.

The device according to the present invention may further comprise a pair of pistol grips mounted to the frame and spaced apart a distance convenient for being grasped by a human operator, a sound cannon trigger mounted to a first one of the pistol grips and a light source trigger mounted to the other of the pistol grips.

DETAILED DESCRIPTION OF THE INVENTION

Figure 1:
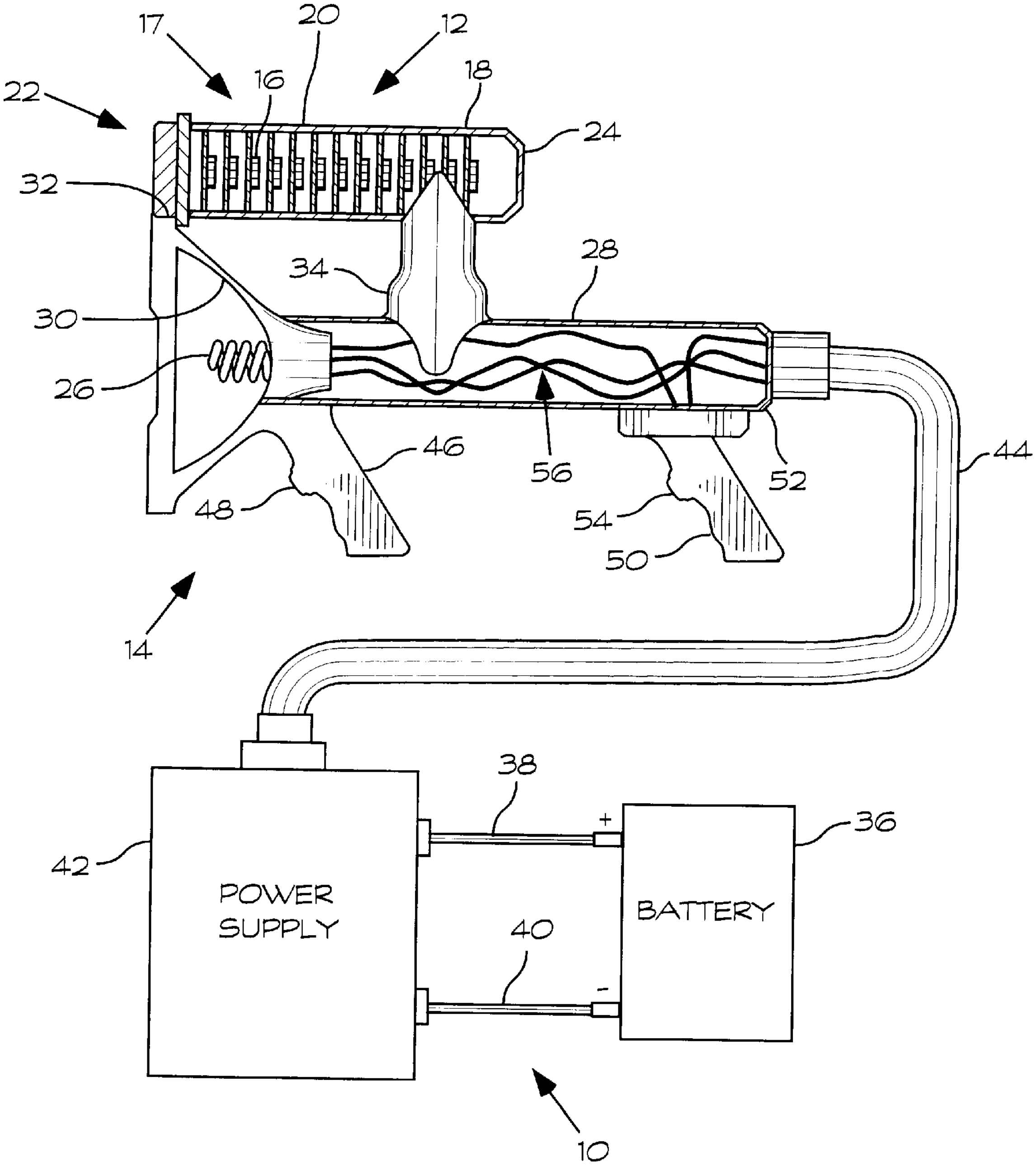
FIG. 1 schematically illustrates a crowd control device according to the present invention.

As shown in FIG. 1, a crowd control device 10 according to the present invention includes an acoustic cannon 12 and a light source 14. The acoustic cannon 12 of FIG. 1 may include a plurality of sound sources 16 arranged in a linear array 17. The sound sources 16 may be mounted inside a housing 18 that preferably is formed as a tube 20 having an open end 22 and a closed end 24. The sound sources 16 are preferably commercially available piezoelectric transducers.

The operation of the linear array 17 of sound sources 16 is based on the phasing, spacing, and/or frequency mixing of this array. This is to produce acoustic reinforcement forward, and partial cancellation sideways. This is illustrated mathematically by three simple point source piezoelectric transducers, a, b, c, operating in open space, and operating at frequencies $f_a$, $f_b$ and $f_c$, which can be identical or different, with phases $\phi_a$, $\phi_b$ and $\phi_c$, respectively.

Figure 2:
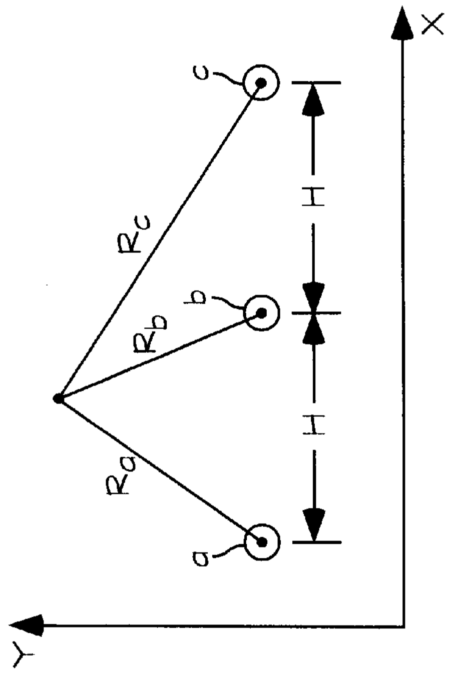
FIG. 2 illustrates relationships between sound sources and a location where the sounds are received

As shown in FIG. 2, the sound sources 16 are uniformly spaced a distance H apart at one-third wavelength apart, may be written as $H=\lambda/3$ where $\lambda$ is the wavelength.

The expression for pressure propagation from such a source is:

$$P_a(R_a, t) = A\exp\left(\frac{i(\omega_a t - kR_a - \phi_a)}{R_a}\right). \tag{1}$$

If all frequencies are the same, $f_a$, the sources uniformly phased (0, 120, 240 degrees), and the spherical distance from each source is $R_a$, $R_b$ and $R_c$, and the amplitude summation in taken in the x-y plane only (x along the planar array, and y perpendicular), the summation of the pressure amplitudes is $$\sum P = A\sin\left(\frac{\omega_a t - k\sqrt{x_a^2 + y_a^2}}{\sqrt{x_a^2 + y_a^2}}\right) + B\sin\left(\frac{\omega_b t - k\sqrt{x_b^2 + y_b^2} - \frac{2\pi}{3}}{\sqrt{x_b^2 + y_b^2}}\right) + C\sin\left(\frac{\omega_c t - k\sqrt{x_c^2 + y_c^2} - \frac{2\pi}{4}}{\sqrt{x_c^2 + y_c^2}}\right), \tag{2}$$

where $R_a$ is the radial distance in terms of its x and y components. The spacing of sources=$H=f/k=1/3$ where k is the wavelength number=$2\pi/\lambda$. If $\phi_a$ is set=0, then $\phi_b=\lambda k/3=2\pi/3$, and $\phi_c=2Hk=4\pi/3$. The sound sources typically operate at about 3400 Hz.

As shown in FIG. 1, the light source 14 may include a flash tube 26 mounted at an end of a tubular frame 28. The light source may alternatively comprise a suitable laser (not shown). A reflector 30 preferably is arranged to reflect light emitted from the flash tube 26 so that an intense light beam is directed parallel to the sound waves emitted from the acoustic cannon 12. The acoustic cannon 12 may be mounted to an edge 32 of the reflector 30 and to a mounting post 34 that extends between the tube 20 and the frame 28.

Electrical power may be provided by a battery 36 or by an external source (not shown). Suitable leads 38 and 40 connect the battery 36 to a power supply 42 that provides suitable electrical power to the acoustic cannon 12 and the light source 14. The battery 36 and power supply 42 may be arranged to be carried in a backpack (not shown) so that the crowd control device is man-portable.

A flexible conduit 44 carries electrical leads for providing electrical power to the acoustic cannon 12 and the light source 14. A first pistol grip 46 extends from the housing 28 near the light source 14. A sound cannon trigger 48 is mounted in the pistol grip 46. A second pistol grip 50 is extends from the housing 28 near its rear end 52. An light source trigger 54 is mounted in the pistol grip 50. Electrical leads 56 are connected to the acoustic cannon 12, the light source 14, the sound cannon trigger 48 and the light source trigger 54 so that a person operating the crowd control device 10 may conveniently actuate the acoustic cannon 12 and/or the light source 14.

Figure 3:
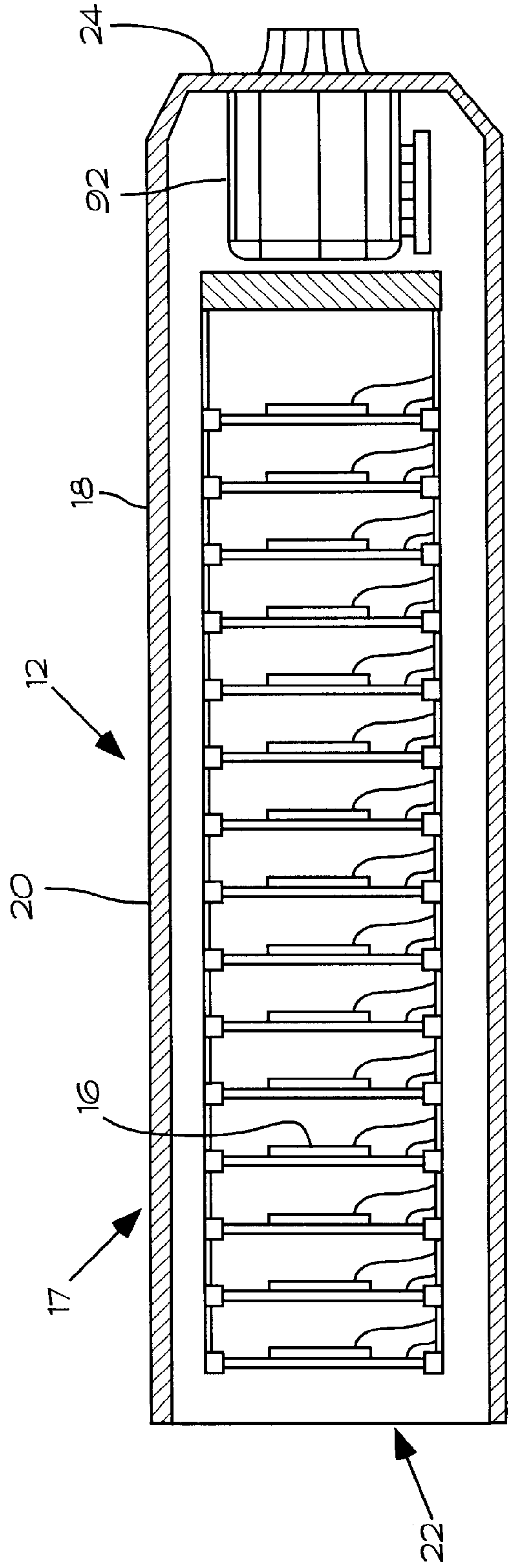
FIG. 3 illustrates a sound generator that may be included in the crowd control device of FIG. 1.

FIG. 3 shows additional structural features of the acoustic cannon 12. The piezoelectric acoustic transducers 16 are connected in series and linearly spaced apart in the housing 18 so that positive acoustic wave reinforcement occurs in the housing 18 as the piezoelectric acoustic transducers 16 are energized. The tube 20 is closed at the back end 24, and phase reinforcement enhances forward propagation toward the open end 22.

Figure 4:
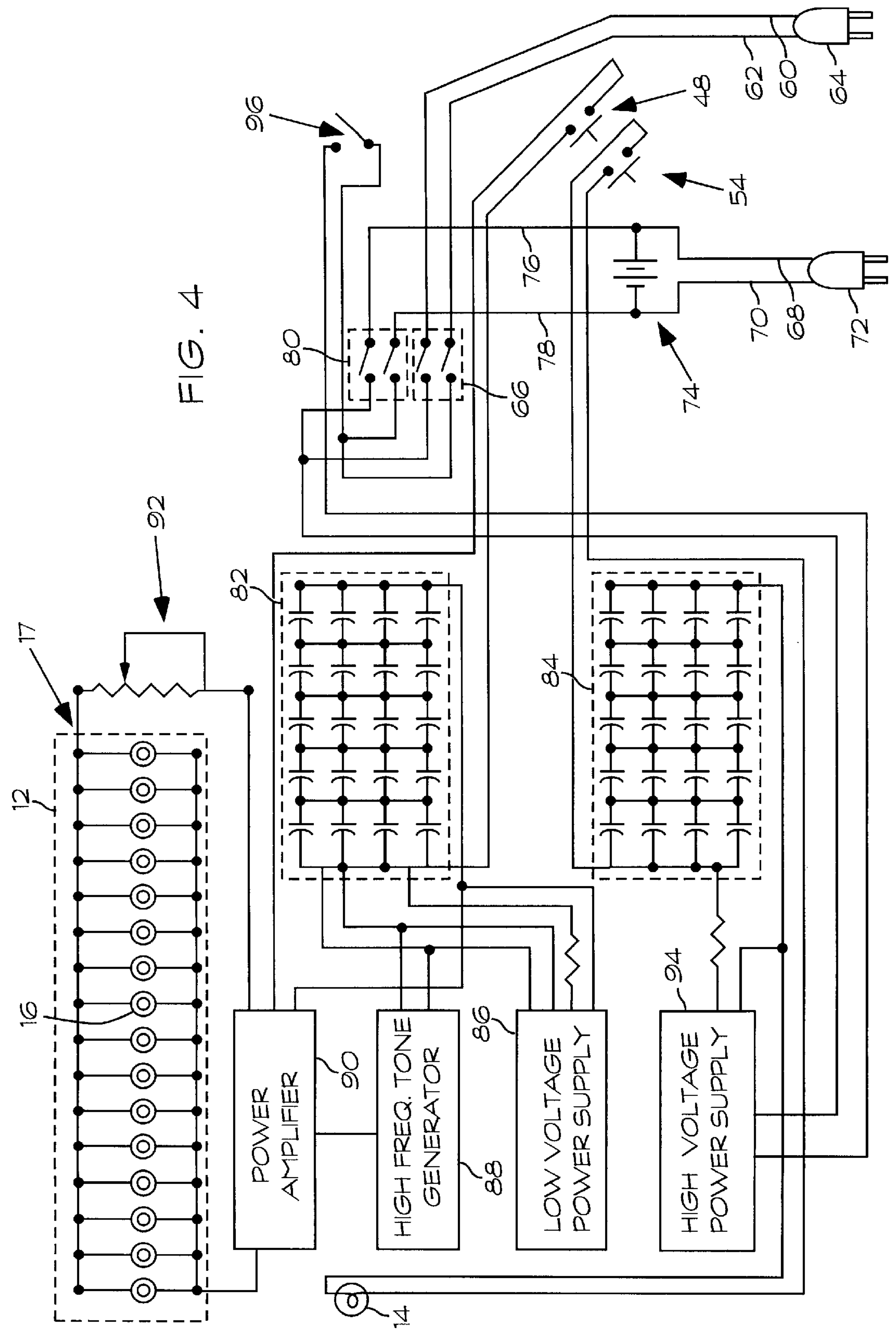
FIG. 4 illustrates electrical circuitry that may be included in the crowd control device of FIG. 1.

FIG. 4 shows circuitry of an embodiment of the crowd control device 10 that is designed for connection to an external power source (not shown). Electrical leads 60 and 62 from a connector 64 for an external power source (not shown) are connected to a first power source selection switch 66. Electrical leads 68 and 70 extend from a connector 72 for an external power source (not shown) are connected to a rechargeable battery 74. Electrical leads 76 and 78 extend between the battery 74 and a second power source selection switch 80.

An operator uses the power source selection switches 66 and 80 to provide electrical power to the acoustic cannon 12 and to the light source 14. Turning on the power source selection switches 66 and 80 charges corresponding capacitor banks 82 and 84. When the crowd control device 10 is to be used, the operator actuates the sound and light triggers 48 and 54 as necessary.

Actuation of the sound control switch 48 causes the capacitor bank 82 to discharge into a power supply 86, a tone generator 88 and a power amplifier 90. The power amplifier 90 provides the amplified signal output from the tone generator 88 to the array 17 of sound generators 16. A potentiometer 92 may be used to control the voltage applied to the sound generators 16. Controlling the sound generator voltage allows the user to control the amplitude of the sound output from the acoustic cannon 12.

Actuation of the light control switch 54 causes the capacitor bank 84 to discharge into a high voltage power supply 94 that provides electrical power to the light source 14.

Figure 5:
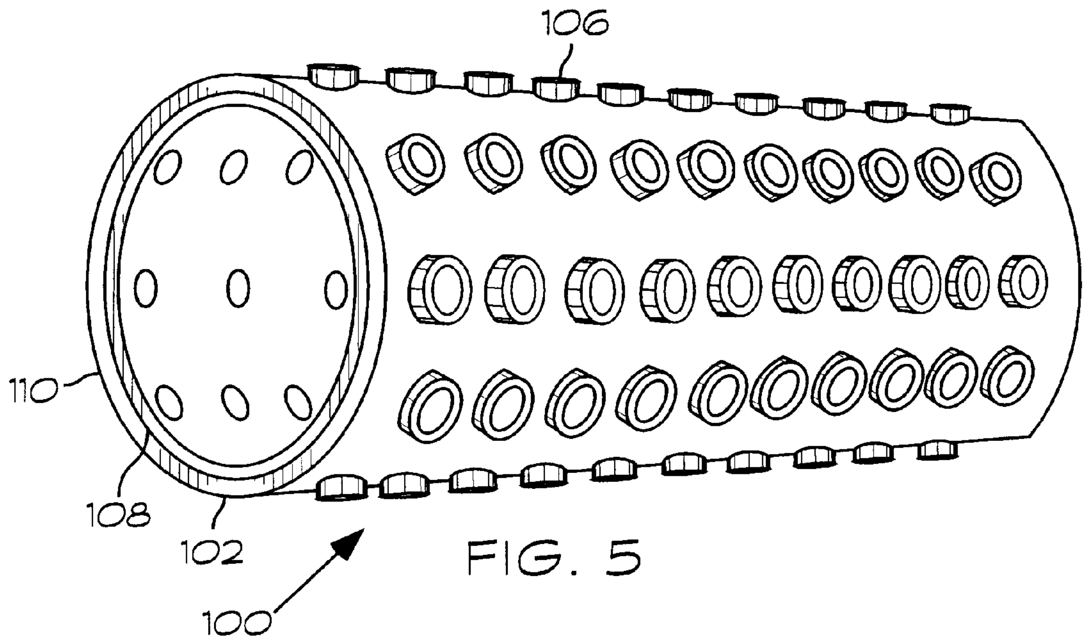
FIG. 5 is a perspective view of an alternate embodiment of an acoustic cannon that may be included in the present invention.
Figure 6:
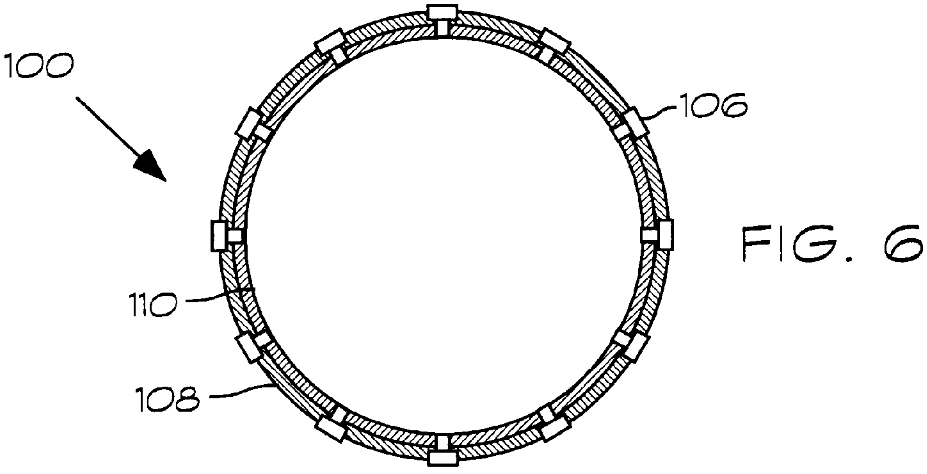
FIG. 6 is an end elevation view of the acoustic cannon of FIG. 5.
Figure 7:
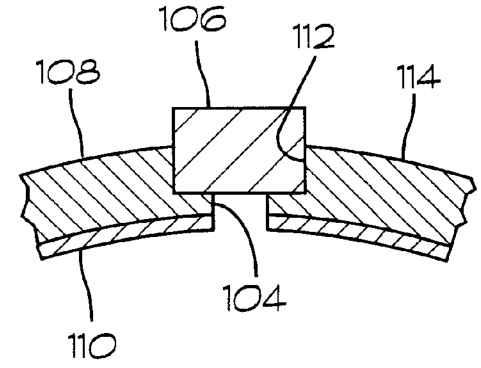
FIG. 7 is a cross sectional view of a portion of the acoustic cannon of FIG. 5.

FIGS. 5–7 illustrate an acoustic cannon 100 that may be included in the crowd control device 10 according to the present invention. The acoustic cannon 100 comprises a tube assembly 102 having a plurality of radial passages 104 therein. The tube 102 has an open end and a closed end as described above. In each of the passages 104 there is mounted a sound source 106. The sound sources 106 are preferably either piezoelectric transducers as described above or sirens.

The tube assembly 102 preferably includes an inner tube 108 formed of a metal such as aluminum and an outer tube formed of a material such as PVC. Each sound source 106 preferably is formed to have a generally cylindrical outer configuration. Each sound source 106 is preferably mounted in a corresponding cylindrical recess 112 formed in the outer wall 114 of the PVC outer tube 110 as best shown in FIG. 7. The passages 104 are formed in the bottom center portion of each recess 112 so that the sound sources 106 are mounted on circular ledges in the outer tube 110.

The sound sources preferably are arranged in a plurality of angularly spaced linear arrays as shown in FIG. 5. The sound waves emitted from the sound sources 106 enter the tube 102 via the passages 104 and combine to form a high amplitude wave that is emitted from the open end of the tube 102.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An audio-visual device for deterring human behavior, comprising:

a frame formed generally as an elongate tube having a closed end and an open end;

a light source mounted to the open end of the frame and arranged to produce a light beam that may be directed to a selected location;

a sound cannon mounted to the frame arranged to produce a sound wave that may be directed out the open end of the frame to the selected location;

an electrical system that may be controlled by a human operator to cause the light source and the sound cannon to produce a light beam and a sound wave, respectively, that may be directed to the selected location to encourage a person to move away from the selected location;

a pair of pistol grips mounted to the frame and spaced apart a distance convenient for being grasped by a human operator;

a sound cannon trigger mounted to a first one of the pistol grips; and a light source trigger mounted to the other of the pistol grips.

2. An audio-visual device for deterring human behavior, comprising:

a frame formed generally as an elongate tube having an open end and a closed end;

a light source mounted to the open end of the frame and arranged to produce a light beam that may be directed to a selected location;

a sound cannon mounted to the frame arranged to produce a sound wave that may be directed out the open end of the frame to the selected location;

an electrical system that may be controlled by a human operator to cause the light source and the sound cannon to produce a light beam and a sound wave, respectively, that may be directed to the selected location to encourage a person to move away from the selected location;

a power source selection switch connected to the electrical system;

a first electrical connector arranged for connection between the electrical system and an external electrical power source; and a battery connected to the power source selection switch such that a human operator may actuate the power source selection switch to control whether the electrical system receives electrical power from the battery or from the external electrical power source.

3. A centralized end-fired array combination audio-visual device for influencing human behavior, comprising:

a longitudinal insulated and internally reflective tube having a closed end and an open end;

a sound cannon audio generating system having an array of piezoelectric transducers mounted on the tube and arranged to produce sound waves directed radially inward and out the open end towards a selected location;

a visual light system mounted in the open end of the tube to produce a light beam that may be used independently or in combination with the audio system and directed to a selected location;

a pair of pistol grips mounted to the tube and spaced apart a distance convenient for being grasped by a human operator;

a sound cannon audio trigger mounted to a first one of the pistol grips and a light source trigger mounted to the second of the pistol grips so that they may be engaged independently or in combination at any time;

an electrical system that may be controlled by an operator to cause the sound cannon audio source and the light source to produce a sound wave and a light source independently or in combination and directed towards a selected location to encourage a person to move away from the location;

a power source selection switch connected to the electrical system;

a first electrical connector arranged for connection between the electrical system and an external electrical power source;

a second electrical connector arranged for connection between the electrical system and a battery so that an operator may actuate the power source selection switch to control whether the electrical system receives power from the battery or from an external power source.

* * * * *